June 6, 1950   L. KOOISTRA   2,510,118
FOG DISPERSAL SYSTEM
Filed Feb. 15, 1946   7 Sheets-Sheet 1

INVENTOR
Lambert Kooistra
BY
ATTORNEY

INVENTOR
Lambert Kooistra
BY
ATTORNEY

June 6, 1950 L. KOOISTRA 2,510,118
FOG DISPERSAL SYSTEM
Filed Feb. 15, 1946 7 Sheets-Sheet 5

INVENTOR
Lambert Kooistra
BY
ATTORNEY

INVENTOR
Lambert Kooistra
BY
ATTORNEY

June 6, 1950 — L. KOOISTRA — 2,510,118
FOG DISPERSAL SYSTEM
Filed Feb. 15, 1946 — 7 Sheets-Sheet 7

INVENTOR
Lambert Kooistra
BY J. J. Moran
ATTORNEY

Patented June 6, 1950

2,510,118

UNITED STATES PATENT OFFICE 2,510,118

FOG DISPERSAL SYSTEM

Lambert Kooistra, Akron, Ohio, assignor to The Babcock & Wilcox Company, Rockleigh, N. J., a corporation of New Jersey Application February 15, 1946, Serial No. 647,745

18 Claims. (Cl. 244—114)

The present invention relates to improvements in fog dispersal systems. Systems of this character are especially designed for and particularly useful in clearing aircraft landing areas, such as an airfield runway or landing strip, to permit an uninterrupted aircraft operating schedule irrespective of adverse atmospheric conditions. While such systems are primarily adapted for land installations, they are capable of use with minor modifications in floating installations, such as aircraft carriers or seadromes.

Fog is formed of condensed aqueous vapor suspended in the atmosphere at or near the surface of the earth and is frequently of sufficient density to obscure vision. Such fog conditions are a serious hazard to all forms of transportation and particularly so in the case of aerial transportation as a low or zero ceiling over the landing area makes it difficult for a pilot to locate the landing area, or when the area is located, to judge landing conditions with sufficient accuracy to insure safe landings. Under such conditions, operating schedules are interrupted, considerable financial loss is suffered due to aircraft being grounded during the fog period and passenger reservations cancelled, and a substantial loss in passenger good will results. Fog is thus considered one of the greatest obstacles to the desired goal of all-weather civil air transportation. Similar problems exist in the operation of military airports to an even greater degree due to the exigencies of aerial warfare.

The fog dispersal problem for aircraft landing fields is complicated by the large areas involved in such installations, runways of 3000–5000 feet in length being customary and a clear area extending beyond each side of the runway being desirable for substantially its entire length. While costs of installation and operation are not determinative in so far as military airports are concerned, such costs are major factors in the installation of any fog dispersal system at a civil airport. Economical operation and, especially in the case of military airports, rapidity of starting up and completely shutting down, are thus essential to the wide use of any fog dispersal system.

While various methods of fog dispersal have been heretofore proposed, the only method which has heretofore proved sufficiently effective and reliable to have gone into actual use involved the dispersal or dissipation of fog by the release of enormous quantities of heat directly into the atmosphere along opposite sides of the runway, the heat transmitted by radiation and convection being sufficient to evaporate the finely divided moisture particles in suspension for a considerable height above ground level. Such installations have been confined to military airports due to the extremely high cost of operation. In such installations the heat has heretofore been derived from the burning of large quantities of high-octane aviation gasoline in suitable burners bordering the runways, the operation taking place in two distinct phases: the liquid fuel being first vaporized, and the resulting vapor then burned in a substantially continuous low open flame. In such a two-phase system, a high volatile fuel, such as gasoline, is a practical necessity, making operation on the scale used, i. e. a heat release of approximately 30–80 therms (3,000,000–8,000,000 B. t. u.) per yard per hour, very costly. Installation costs are also high due in part to the extensive concrete trough system ordinarily required to accommodate the vaporizer and burner sections, particularly when the apparatus is installed below ground level so as to minimize interference with aircraft operation on the field. Furthermore, in starting-up there is a delay of from ten to fifteen minutes before full thermal capacity operation is attained and normal fog dispersal action effected because of the preliminary heating and vaporizing required. Moreover, initial combustion is accompanied by a considerable amount of heavy smoke which in itself serves to decrease visibility. There is also an appreciable time-lag in completely closing-down a two-phase system, due to residual combustion which tends to be smoky because of incomplete vaporization of the fuel.

Although the described two-phase system has been successfully operated in wartime on military airports, its high cost of operation alone renders any wide use of the same for commercial airports economically prohibitive.

The main object of the present invention is the provision of a fog dispersal system of the fog evaporation type in which a liquid fuel is burned under conditions providing a maximum heat liberation per unit of fuel cost. A further and more specific object is the provision of a fog dispersal system of the character described in which a wide range of liquid fuels may be effectively employed, varying from high volatile low flash point gasolines to low volatile high flash point fuel oils, such as kerosenes or Diesel fuels. A further specific object is the provision of a fuel burning fog dispersal system having a substantially instantaneous starting-up period to reach normal thermal capacity operation over its entire length without fuel preheating, and an instantaneous cutting-off of the fuel burning period with elimination of residual burning. A further specific object is the provision of a fuel burning fog dispersal system having a relatively low cost of manufacture, installation and operation, requiring a minimum alteration of existing airports, and affording little, if any obstruction of the airport to aircraft operation both during and after installation. A further specific object is the provision of a fuel burning fog dispersal system in which the fuel burning apparatus is divided into sections longitudinally of the runway with a selective control of the operation of each section.

In accordance with my invention, a fuel burning fog dispersal system is provided in which a liquid fuel is discharged into the atmosphere in a highly atomized condition in a multiplicity of jets arranged in groups with the atomized jets spaced sufficiently to avoid such interference between adjacent flames which would cause smoky combustion conditions, and yet close enough to permit interignition of the fuel jets of each group, so that a substantially continuous line of clear flame results. While in its broader aspects, my invention includes both fluid and mechanical atomization of a relatively wide range of liquid fuels, it is more specifically directed to a system for the high pressure mechanical atomization of low grade fuels, such as the kerosenes and Diesel fuel oils, because of the substantially lower fuel cost and power requirements and other advantages of such a system.

Heretofore in liquid fuel burning systems employing mechanical-pressure atomization, both atomization and subsequent combustion have been effected in a closed chamber such as a furnace, with the benefit of hot surrounding refractory-faced walls, and usually with the benefit of preheated fuel. In such systems also, certain auxiliary apparatus is required to maintain a supply of air to the discharging atomized fuel, and to direct such air into intimate contact therewith. In prior systems, therefore, where furnace environments are involved, a suitable degree of fuel atomization has been effected with relatively low oil supply pressures, the usual practical maximum range being from about 75 p. s. i. to 300 p. s. i.

In my proposed system where the fuel is to be burned in the open and with a clear flame, I have found that for a given grade of fuel a much higher degree of fuel atomization must be effected than heretofore required as for example in mechanical atomizing furnace burners. At pressures such as 300 p. s. i., the resultant conical spray is too coarse for satisfactory use in an unheated open atmosphere because the droplets in the spray cone would not provide sufficient surface contact with air to enable each fuel droplet or particle to be consumed completely before it reached the end of its trajectory.

An important feature of my invention therefore is to speed up the combustion reactions by atomizing the fuel at pressures substantially higher than formerly employed, preferably at pressures of the order of 1000 p. s. i. and above, firstly, to effect finer atomization of fuel particles to facilitate ignition and flame propagation, and thus provide more rapid combustion, and secondly, to provide a higher velocity of each fuel particle relative to the adjoining air and thus improve the admixture of oxygen to support combustion. When such higher fuel pressures are employed, the increased pressure drop through the atomizer orifice results in a spray cone of high velocity oil particles which acts to induce a flow of adjacent atmospheric air in a corresponding direction toward the combustion zone. By arranging the atomizer outlet at a predetermined position relative to ground level, and for discharge in an upward direction therefrom, the flow of air induced by the high velocity conical spray enhances air flow into proximity with the atomized fuel so that attainment of smokeless combustion is facilitated without the use of auxiliary air-supplying and air-directing apparatus.

At the higher atomizing pressures which I propose to employ, the resulting fineness of fuel atomization also makes it possible to operate with unheated fuel regardless of outdoor temperatures, thus effecting a further economy. Operation at the higher fuel supply pressures also results in higher rates of fuel flow per nozzle which with the fine atomization attained effects a higher heat release per nozzle or burner, thereby reducing the total number of burners required and, furthermore, providing a concentration of heat conducive to the maintenance of a high temperature zone into which the atomized fuel is continuously discharged, an advantageous environment for smokeless combustion of lower grade fuel oils.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

Of the drawings:

Fig. 8 is a plan view of Fig. 7;

Fig. 9 is a sectional view of Fig. 7 taken along line 9—9;

Fig. 10 is an enlarged underside view of the sprayer plate included in Fig. 7;

Fig. 11 is a sectional view taken along line 11—11 of Fig. 10;

Fig. 12 is an underside view of a modified form of sprayer plate;

Fig. 21 is an end view of Fig. 20, partly in section along line 21—21;

Figure 1:
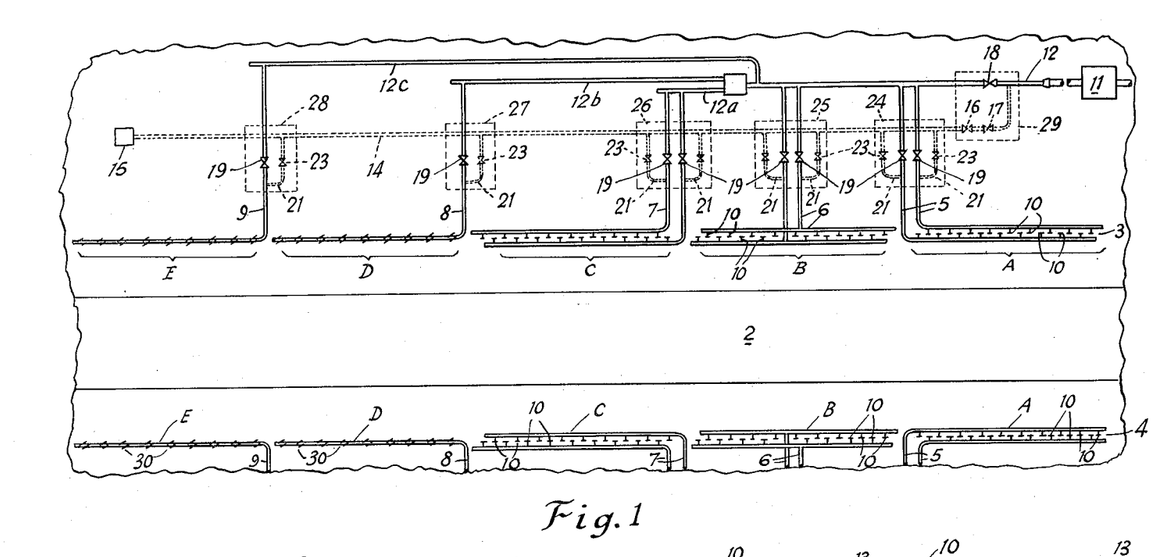
Fig. 1 is a diagrammatic layout, in plan, of a fog dispersal system constituting an embodiment of my invention.
Figure 2:
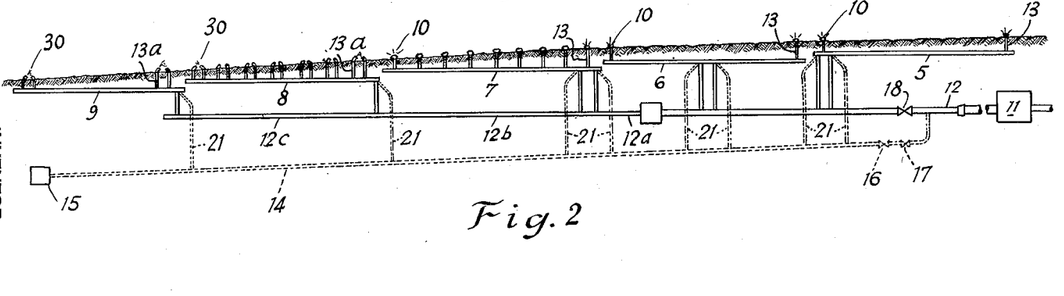
Fig. 2 is a diagrammatic layout, in elevation, of the system illustrated in Fig. 1.

Figs. 1 and 2 illustrate an embodiment of my invention in the form of a fuel burning fog dispersal system installed in relation to an airfield runway 2, it being understood that the illustrations are diagrammatic to indicate the general arrangement of parts without regard to specific dimensional relationships. Burners are arranged in spaced relation in rows 3, 4, at opposite sides of the runway and in each row the burners are divided into main groups or sections A, B, C, D and E, having separately controllable fuel supply lines 5, 6, 7, 8, 9, to permit selective operation. Where advection fogs normally approach in one direction, the burners may be installed on the windward side of the runway only. The groups A, B and C are further divided to provide secondary separately controllable groups or sections of which the burners 10 alternate as shown in each of the rows 3 and 4. By way of example, the burner sections A, B, C, D, E, may be considered as having a combined length of 3000 feet or more along a runway 2 of 150 feet in width, each row of burner sections being spaced from the runway by a distance of approximately 100 or 200 feet as a minimum.

Figure 27:
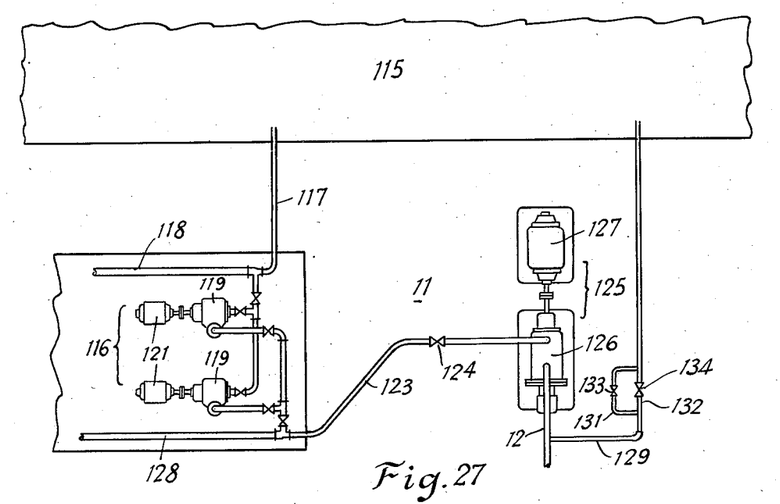
Fig. 27 is a plan layout of the main fuel storage and feed pump unit.

Fuel is supplied under pressure to the system by means of pumping apparatus 11 arranged for example as in Fig. 27, the discharged fuel being delivered through feed main 12 and its branches 12a, 12b, 12c, to the section supply lines 5, 6, 7, 8, 9; to which the burners of respective sections are connected.

In the installation shown, where the terrain slopes gradually from one end of the runway toward the other, each burner line is installed horizontally below ground level, and successive lines at progressively different elevations corresponding to the slope of the terrain. The feed main 12, inclusive of its branches, is also laid horizontally, preferably at or below the level of the lowest section line 9. Individual burners are connected to the section lines through risers 13 and 13a of suitable lengths to elevate each burner outlet to a position superjacent ground level at which an adequate flow of atmospheric air may be maintained to the zone of atomized fuel discharge.

A drain line 14 is provided through which the fuel distributing system may be placed under suction and fuel withdrawn from all or selected portions, the drain line being suitably installed below the level of the various fuel supply lines at an inclination to the horizontal and having its lowermost end connected to a drain pump unit 15, its opposite uppermost end being connected through a check valve 16 and cut-off valve 17 to the feed main 12 at the inlet or feed pump side of the main fuel valve 18.

Figure 3:
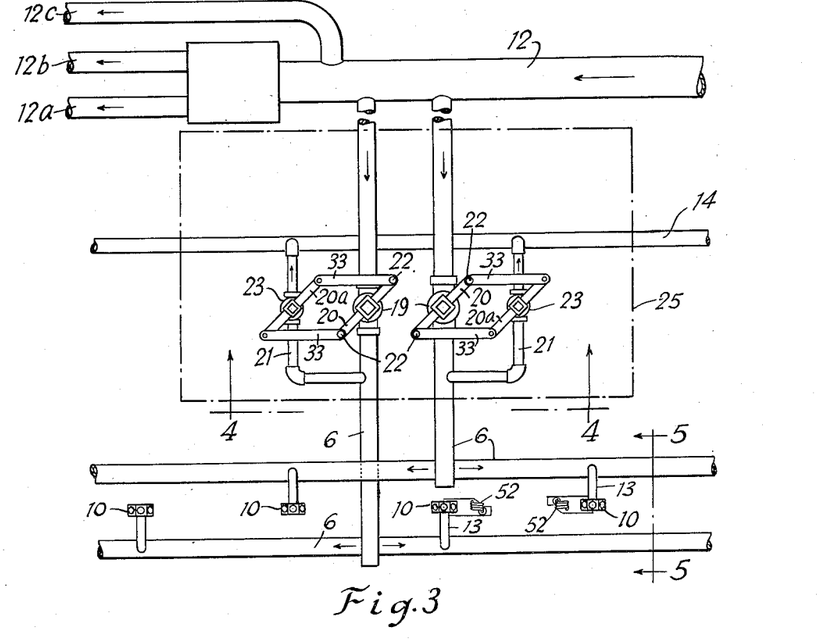
Fig. 3 is an enlarged partial plan view showing details of Fig. 1.
Figures 4, 5, 6:
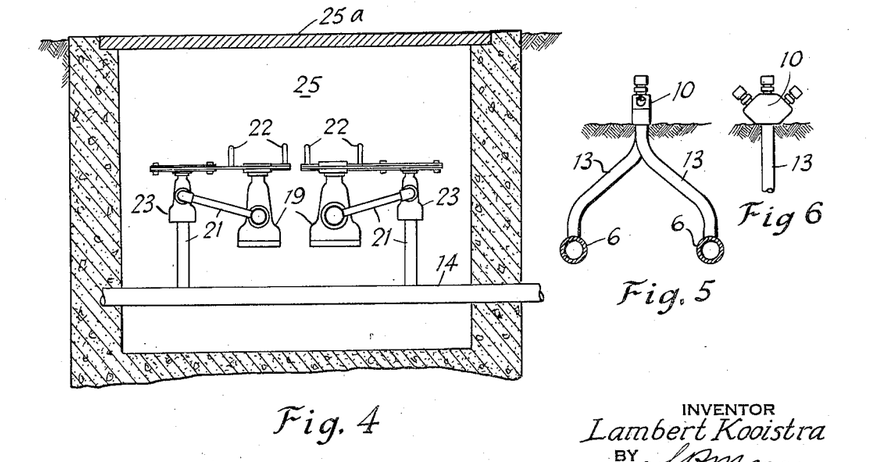
Figs. 4 and 5 are vertical sections taken along line 4—4 and line 5—5 respectively of Fig. 3.
Fig. 6 is a partial side view, and Fig. 7, a corresponding enlargement partly in section, of the multi-tip burner included in Fig. 5.

Each section line 5, 6, 7, 8, 9 is provided with a plug valve 19 therein for controlling the supply of fuel to each burner group, A, B, C, D, E; each section line having a drain connection 21 from the outlet side of valve 19 to the drain line 14; and the connection 21 having a plug valve 23 therein operable in unison with the plug valve 19 as detailed in Figs. 3 and 4. The valve control mechanism comprises an operating lever 20 mounted on the stem of each fuel valve 19 and provided with handles 22 at opposite ends, a similar lever 20a being mounted on the stem of each corresponding drain valve 23 and pivotally connected to the operating lever 20 of valve 19 by link bars 33. The control valves for the respective sections are grouped within valve pits 24, 25, 26, 27, 28 as indicated by rectangles in Fig. 1, a typical arrangement being illustrated in Figs. 3 and 4 where valve pit 25 for section B is shown having its cover 25a substantially flush with the surface of the ground. The main fuel valve 18 and the drain line valves 16 and 17 are grouped within a similar pit 29.

Figure 22:
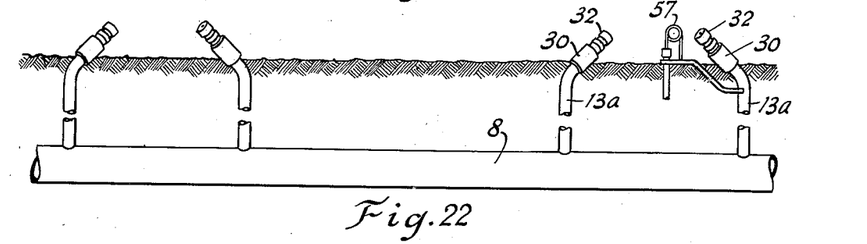
Figs. 22 and 23 are enlarged side and plan views respectively, of a burner arrangement included in Figs. 1 and 2.
Figure 23:
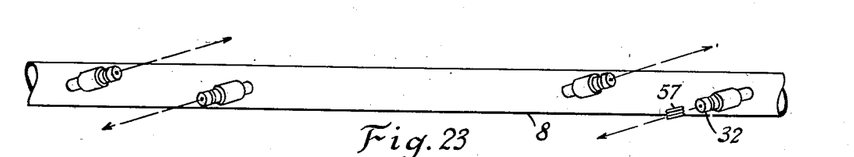

The burners 10 and 30 for sections A, B, C, D, E, are of a mechanical pressure atomizing type adapted to operate at especially high pressures to provide a high degree of atomization and a high rate of heat liberation using various low grade hydrocarbon oils. Burners 10 for sections A, B and C include a flat sided body portion 31 in which each nozzle 32 is secured as by a threaded connection 34, a group of three nozzles being employed having axial discharge orifices 35 in a common plane, each outer nozzle diverging from the central nozzle at approximately 45°. As assembled in each row 3 or 4, all nozzles for a given section A, B or C discharge upwardly in a common vertical plane, as seen in Figs. 3 and 5. Burners 30 for groups D and E utilize the same form of nozzle 32 but in different relation as shown in Figs. 22 and 23 to be later described.

The burner body portion or block 31 may be formed from plate stock suitably machined to provide intersecting bores 36, 37, 37, for conducting fuel from the riser 13 to each of the nozzles 32, each nozzle body 38 being suitably formed from flat-sided bar stock and having circumferentially spaced ports 39 extending from a central passage 41 to an annular fuel distributing recess 42 at its outer end. A sprayer plate 43, having a whirl chamber 45 therein terminating in the orifice 35, is formed with four transverse slots 46 for conducting fuel from the recess 42 into the whirl chamber 45 in substantially tangentially directed streams, the slots 46 entering a cylindrically walled portion 47 of the chamber rearwardly of the conically walled portion 48. The sprayer plate is held in assembled sealed relation adjacent the outer end of nozzle body 38 by means of a flat-sided cap 49 having a threaded connection 51 therewith. The number of slots 46 may be increased or decreased to meet operating requirements, as for example in Fig. 12 where two slots 46a are shown.

In the operation of a nozzle 32 in the present system, a high degree of fuel atomization is essential to enable the fuel to be burned in the open with a clear flame, and preferably without preheating of the fuel. Thus, for a single nozzle 32, when the fuel is a low volatile high flash point oil such as No. 3, Diesel oil, atomizing pressures ranging from 1000 to 1500 p. s. i. are desirable for capacities ranging from about 180 to 1100 lbs. of oil per hr. using a graduated set of sprayer plates 43; the capacities varying from about 180 to 230 lbs. of oil per hr. using a sprayer plate 43 having an orifice area of 0.001018 sq. in., and capacities from about 880 to 1100 lbs. of oil per hr. using a sprayer plate having an orifice area of 0.003167 sq. in.; in each instance, the ratio of total tangential port area to orifice area being desirably maintained within limits of about 3:1 and 4:1.

In general, for a given plate and capacity, higher atomizing pressures are required for fuels of heavier grades, and lower atomizing pressures for fuels of lighter grades, the latter including for example such lighter petroleum products as kerosene and gasoline which may be satisfactorily atomized at pressures between 500 and 1000 p. s. i. For a given fuel, within the permissible range of atomizing pressures, it will be found that a higher pressure always produces the better result, and under wind conditions is often required in order to provide adequate stability of flame.

A burner 10 having three nozzles 32, using the largest size sprayer plate of the above mentioned set, may therefore be utilized to provide an output of 3300 lbs. of oil per hr. when supplied with No. 3 oil at 1500 p. s. i., a row of such burners operating at spacings of 15 feet from a single burner line 5, for example, providing an equivalent thermal output capacity of about 12,500,000 B. t. u. per yard per hour, a thermal output commonly expressed in "therms" as 125 therms per yard per hour. For a complete section A with the burners of both lines 5 in action, the thermal output would of course be doubled.

For practical purposes however, from a standpoint of economy, and to provide a lower flame limited to about 7 or 8 feet in height, a thermal output of about 60 therms per yard per hour per burner line 5 may be considered a suitable maximum making a total output of about 120 therms per yard per hour for a complete burner section A, B, or C at one side of the runway, or for two half-sections A, B, or C operating simultaneously at both sides of the runway; the maximum available output being about 240 therms per yard per hour if complete sections A, B, or C should be operated simultaneously at both sides. Such outputs may be provided, for example, by burners 10 of each line 5, 6, or 7 arranged on centers of 15 feet, and utilizing No. 3 oil supplied at a pressure of 1500 p. s. i., the sprayer plates in this instance each having an orifice area of 0.002124 sq. in., and a capacity range varying from about 300 to 520 lbs. of oil per hour at pressures ranging from 500 to 1500 p. s. i.

In the end sections D and E a somewhat lower maximum available output may be provided than in sections A, B or C at the approach end of the runway; in sections D and E the burners 30 being arranged in pairs, and each burner including only a single nozzle 32 discharging through an orifice area of 0.001018 sq. in. Adjacent pairs of burners 30 are suitably spaced on centers of 4 feet and when supplied with No. 3 oil at 1500 p. s. i. provide a thermal output per section of about 65 therms per yard per hour, the combined output of two sections D or E at opposite sides of the runway thus being about 130 therms per yard per hour.

In the operation of each burner 10 or 30 at the pressures and capacities indicated, the fuel from each nozzle 32 is discharged into the atmosphere in an upward direction in the form of a high velocity conical spray which acts to induce a flow of adjacent atmospheric air to the combustion zone. While the exact course of the air flow in the zone about the atomizers has not been determined, it is believed that air which is involved in the fuel combustion process approaches horizontally along the ground surface from all directions, and that its direction of flow is altered in the zone immediately surrounding the atomizers so that it flows upwardly in contiguous surrounding relationship to the conical pattern defined by the trajectories of the high velocity fuel particles discharged from the atomizer. The contiguous relationship of air flow with respect to the fuel particles, particularly as the latter become more widely separated at increasing distances from the orifice, permits the embracing flow of air to diffuse inwardly and to be entrained in the inter-particle spaces by reason of the higher velocity fuel particles for prompt and complete combustion of the atomized fuel. Since oil flow velocities are maximum adjacent each nozzle orifice 35, it is desirable to position the orifice at a location above ground level where such velocities can enhance the natural movement of air toward the combustion zone. At the same time, it is desirable to install the nozzle as close to ground level as possible so as to limit the height to which the flame extends, and also to lessen interference with ground traffic. In view of these various considerations, each burner 10 or 30 is set so as to elevate each nozzle orifice to a position of about three inches above ground, for example. In a burner having a plurality of nozzles as in the case of a burner 10, the indicated suitable height is that of the lowermost positioned orifices.

In each row 3 or 4, at least one burner of a selected group or plurality has associated therewith an oil ignitor 52, as indicated in Fig. 3 for example, for initiating combustion throughout any section or row, each burner thus lighted serving as a pilot for lighting off one or more adjacent burners so that there results a progressive ignition of all successive burners to which fuel is being supplied.

The ignitor assembly for a burner 10, as detailed in Figs. 13-17 includes a bracket 53 secured to the burner riser 13 for maintaining the ignitor element 52 in predetermined relation to a burner nozzle 32. It has been found that with the type of nozzle disclosed, when a burner is started up, as by opening a fuel valve 19, there is an interval during which fuel pressure at the nozzle must build up to normal, with the result that the initial discharge is a conical spray of larger included angle than when the internal fuel pressure has reached its high normal value and the burner is operating at full capacity. Advantage is taken of this characteristic of operation by positioning the ignitor element 52 so that its effective heating portion is contacted by oil from the initial wide angle low capacity spray 54 upon starting up, but is out of the path of the narrow angle high capacity spray 56 during normal operation.

The ignitor element 52 is formed from a "calrod" electric heating element, a product of General Electric Company, Schenectady, N. Y., the basic construction of which includes an internal helical coil resistor centered within a seamless metal tube or sheath which is packed with magnesium-oxide powder serving as electrical insulation and a heat conductor between the resistor and sheath. The resistor is confined to the required effective heating length of the unit while leads therefrom extend to terminal portions at opposite ends.

Figures 13, 14, 15, 16, 17, 18, 19:
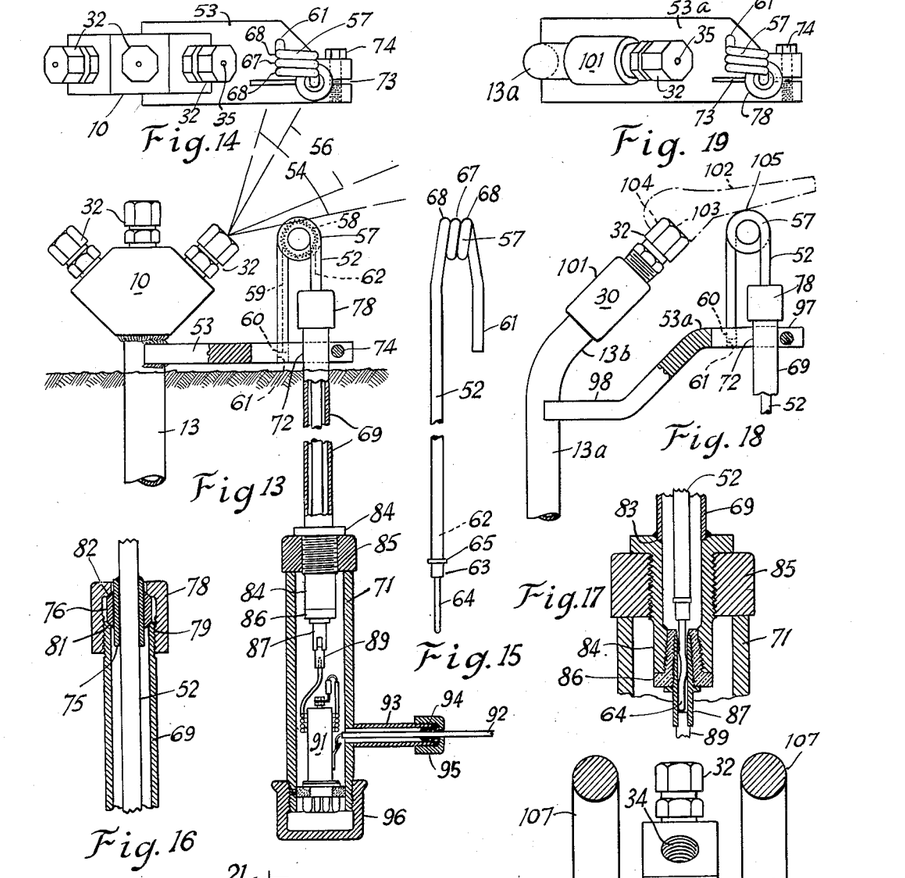
Fig. 13 is a side view, partly in section, showing an ignitor unit in relation to a burner.
Fig. 14 is a plan view of Fig. 13.
Fig. 15 shows an element of the ignitor unit.
Figs. 16 and 17 are enlargements showing details included in Fig. 13.
Figs. 18 and 19 are side and plan views respectively, similar to Figs. 13 and 14, including a modified form of burner.

For purposes of my present invention, the effective heating length of the ignitor element 52 is wound into a helical coil 57 of relatively small diameter having substantially contacting turns as seen in Figs. 13–15. The internal coil resistor 58 has one lead 59 grounded to the sheath at end 60 which is plugged into a hole 61 in the bracket 53, the other lead 62 extending to a metal connector 63 providing the terminal plug 64, an insulating washer 65 being interposed between the metal sheath of rod 52 and the metal connector 63, of greater diameter than both. The coil 57 comprises at least two-and-one-half full turns so as to block radiation of heat from one or more inside turns on three sides, for example, in the form shown, sideward radiation from the central coil or turn 67 is blocked by the two outer coils 68 while inward radiation is blocked by the opposite inner wall of the coil. As a result, the sheath of the central coil 67 may be operated at a temperature of 1500° F. with a minimum wattage input to the resistor coil 58 which is thereby maintained at a minimum safe operating temperature, the temperature of the central coil sheath being about 250° F. hotter than if a single, fully exposed turn or length were used, at an increased wattage input of only about ten percent. The element 52 may be operated from the usual 110 volt supply so that no special equipment such as transformers is necessary.

During operation of burner 10 the flame starts about 6 inches from the tip of nozzle 32 and thus the exposed portion of ignitor 52 is located in a relatively cool zone, under the cold liquid spray cone, where it is shielded from intense flame radiation; in this position also, the ignitor being disposed in a current of air induced by the high velocity oil discharge, which helps to keep the element from becoming overheated should the power be left on during burner operation. The ignitor can also serve as a thawing element as it is close enough to the burner for effective heat transfer, it being capable of raising the temperature of the burner about 70° F. above the ambient temperature.

The lower terminal end 64 of the element 52 extends downward below ground level within a protecting tube or casing 69 joined at its lower end to a terminal housing or cap 71 within which a slideable connection is made to the voltage supply in a zone of relatively low temperature, the casing 69 extending through a hole 72 in the bracket 53 and the bracket being slotted transversely of the hole as at 73 to form a clamp in which the casing 69 is supported by means of bolt 74.

A weather-tight and temperature-proof joint and seal, as detailed in Fig. 16, is provided where the element 52 enters the upper end of casing 69, the formation of this joint comprising a stainless steel sleeve 75 secured as by brazing to the metal sheath of ignitor element 52, a loose packing sleeve or bushing 76 having a close sliding fit over sleeve 75, and a packing nut or cap 78 of stainless steel having a threaded connection 79 with the upper end of casing 69. The ends of bushing 76 are beveled as shown, one end engaging a correspondingly beveled end surface 81 of the casing and the other end being engaged by a correspondingly beveled inner surface of the cap. The sleeve 75 provides a local enlargement of the element 52 so as to require a bushing 76 of large enough inside diameter to enable the washer 65 to pass therethrough when inserting or removing the element 52.

The lower end of casing 69 is secured as by brazing within a counterbore 83 in a flanged stainless steel bushing 84 screwed into nut 85 forming the top end closure of the terminal housing 71. An insulating bushing 86, of molded "mycalex" material, a commercial product including mica as an ingredient, is secured within the lower end of bushing 84, and is fitted with an elongated internal terminal sleeve member 87 forming a jack to receive and provide slideable contact with plug terminal 64 of element 52, the circuit being completed through an adjoining connector 89 and other suitable electrical conductors including a fuse 91 and terminal lead 92 extending outwardly through a tubular extension 93 of terminal housing 71, the lead being sealed to the extension by suitable packing 94 clamped around lead 92 and against the end of the extension by a screwed packing nut 95. A cap 96 is secured to the bottom end of housing 71 to form a closure therefor.

Figs. 18 and 19 show the manner in which ignitor 52 may be held in proper relation to a burner 30 of the type used in sections D and E. In this instance the burner riser 13a has an inclined upper portion 13b making it desirable to provide a bracket 53a having offset upper and lower end portions 97 and 98 respectively, which enable the upper portion 97 to be positioned adjacent ground level as in the case of bracket 53, while enabling the lower end portion 98 to be secured to the vertical lower portion of riser 13a. The remainder of the ignitor assembly is the same as previously described. In this form of burner, a coupling 101 is screwed to the upper end of the riser portion 13b, and a single nozzle 32, of the construction already described, screwed into the coupling. A template or gage 102 may be used in adjusting the ignitor coil 57 to the proper height relative to the nozzle, the gage having right-angled surfaces 103, 104, adapted to be placed in contact with the flat end and flat side surfaces respectively of nozzle cap 49, whereby proper adjustment of the ignitor is indicated when ignitor coil 57 is brought into contact with the gage surface 105. The same pattern of gage 102 may be used in the adjustment of ignitor position for other burners, including a burner 10, for example, as in Fig. 13.

Figure 20:
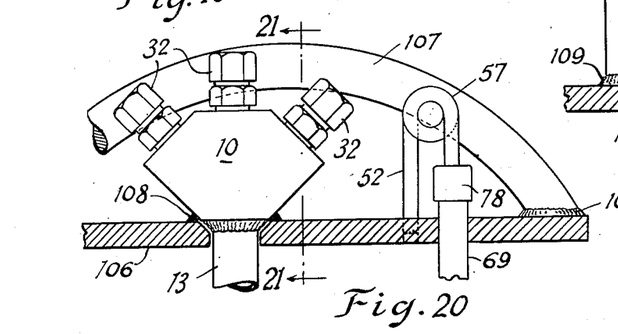
Fig. 20 is a side view, similar to Fig. 13, showing a burner guard.

Figs. 20 and 21 illustrate a means for protecting a burner, or burner and ignitor, from damage by taxiing planes, trucks or other ground traffic. In the form shown, the bracket for supporting ignitor 52 is extended at opposite sides of burner riser 13 to form a base plate 106 serving also as a support for guard bars 107 arranged adjacent burner 10 at opposite sides. The bars 107, suitably of circular cross-section, are arched to a height above both the burner nozzle and ignitor so as to provide adequate protection thereto; the bars being spaced from the centerlines of nozzles 32 to provide clearance for the discharging spray, at the same time affording negligible obstruction to air flow to the combustion zone; plate 106 being fixed in relation to the burner as by welding 108; and bars 107 being welded at their ends 109 to plate 106. As will be understood, a guard of this type is similarly adapted for use in other burner-ignitor combinations, including that shown in Figs. 18, 19, or with individual burners 10 or 30 for example, when not equipped with ignitors.

Figs. 22 and 23 show burners 30 as arranged in pairs in burner sections D and E to provide crossed sprays in parallel pairs, the burner risers 13a being connected to burner line 8 for example in a single longitudinal row, at alternate short and long spacings suitably of twenty and twenty-eight inches respectively. The burners of each pair discharge in opposite directions in parallel vertical planes oblique to the burner line 8, with alternate burners throughout the row discharging in the same direction toward the same side of the burner line axis, as indicated by arrows, the angularity of discharge with respect to the burner line axis being about 15° as measured horizontally, and about 45° as measured vertically; such angularities and spacings being generally desirable for average conditions although other angularities may be utilized, if necessary, to obtain different combustion characteristics and flame patterns.

Figure 24:
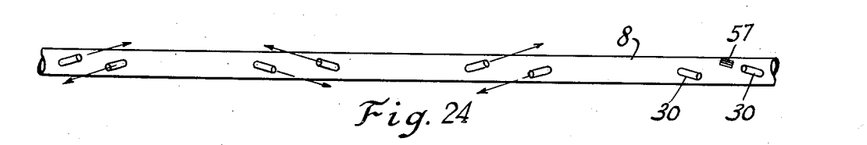
Fig. 24 is a diagrammatic plan view, similar to Fig. 23, showing a modified burner arrangement.

Fig. 24 shows a modified burner arrangement in which pairs of burners 30 provide crossed sprays in opposed pairs, the burners being connected to burner line 8 in a single longitudinal row as in Fig. 23, and the burners of each pair discharging in opposite directions in parallel vertical planes oblique to burner line 8. In this arrangement, as indicated by arrows, alternate burners throughout the row discharge in the same general direction but toward opposite sides of the burner line axis.

Figures 7, 8, 9, 10, 11, 12:
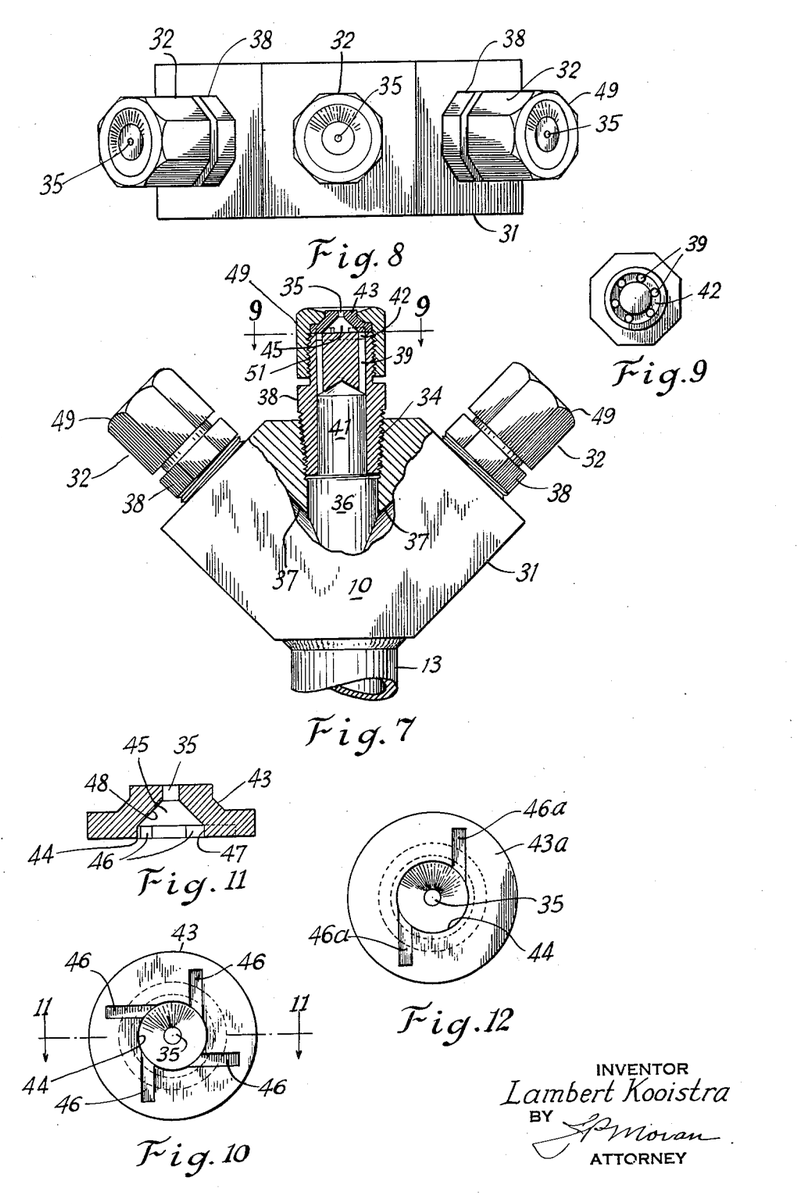
Figure 25:
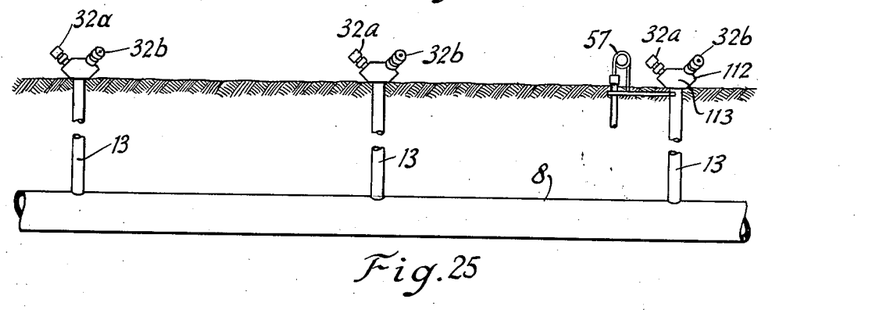
Figs. 25 and 26 are side and plan views respectively, showing an arrangement of multi-tip burners of modified construction.
Figure 26:
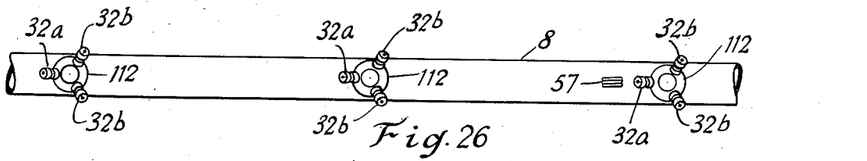

Figs. 25 and 26 show multi-tip burners 112 of modified construction arranged in a row above burner line 8 to which they are connected, each burner comprising a body portion 113 suitably constructed to distribute fuel from a riser 13 to three burner nozzles 32a, 32b, 32b, each of the construction of a nozzle 32, arranged at substantially equal circumferential spacings, each nozzle discharging upwardly at an inclination of about 45° to the horizontal, corresponding to the inclination of discharge for each of the two side nozzles 32 in Fig. 11. Nozzles 32a of successive burners 112 are positioned to discharge in one direction in the vertical plane of the burner line axis, while nozzles 32b are positioned to discharge in a generally opposite direction at equal angles to such a plane, each nozzle 32a thus discharging between oppositely directed diverging discharges of nozzles 32b of the next adjacent burner.

The fuel oil pumping equipment for a system as thus far described, comprises a main feed pump unit 11 suitably of the arrangement illustrated in Fig. 27 wherein fuel from a main fuel storage or tank farm 115 is pumped in two stages for delivery to the feed main 12 at pressures ranging upwardly to at least 1500 p. s. i. Fuel enters the primary pumping stage 116 through a pipe line 117 extended as at 118 if desired to serve as an inlet to additional primary stage components, not shown, depending on the total pump capacity required. Each component of the primary stage 116 includes a rotary pump 119 for example, driven as by electric motor 121. Fuel is discharged from primary stage 116 at a relatively low pressure, suitably of about 125 p. s. i., and is delivered through a pipe line connection 123, having valve 124 therein, to the final high pressure pumping stage 125 comprising a pump 126 driven as by electric motor 127 and discharging direct to feed main 12, the low pressure connection 123 being extended as at 128, for example, to receive fuel discharged from additional primary stage components, if any.

A return connection 129 is made from main 12 and the outlet of high pressure pump 126 to the tank farm 115 whereby, when all burners are cut off and no fuel is being discharged from the system, the pumps 119 and 126 in both stages may be idled at low capacity to maintain a high pressure oil supply instantly available the moment the main fuel valve 18 and any burner line valve 19 are opened, at the same time preventing damage to pumps 119 and 126 by maintaining a flow of oil therethrough. The connection 129 includes two intermediate portions 131 and 132 in parallel, the portion 131, having valve 133 therein, being used for recirculating oil as above described, and the portion 132, having valve 134 therein, being used for returning oil drained from the system as will be later described.

Figure 28:
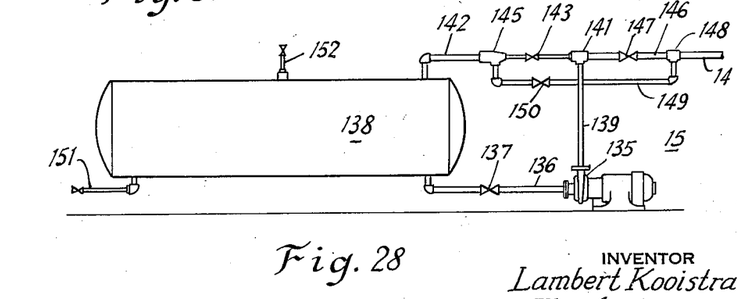
Fig. 28 is a side view of the drain pump unit.
Figure 29:
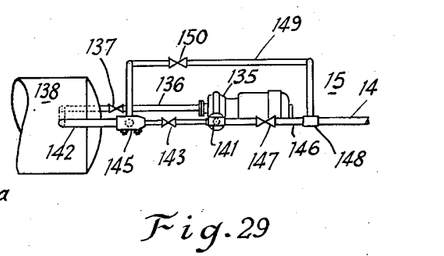
Fig. 29 is a partial plan view of the pump unit illustrated in Fig. 28.

The drain pump unit 15 as shown in Figs. 28–29 comprises a suitably driven pump 135 having an inlet connection 136, including valve 137 therein, from the lower part of a temporary fuel oil storage tank 138, the pump having an outlet connection 139 extending upwardly to a T 141 from one branch of which a connection 142, through valve 143 and jet eductor 145, is made to the upper part of tank 138, and from the other branch of which a connection 146, through valve 147 and T 148, is made to drain line 14 at its lowest level. A connection 149 having valve 150 therein is made from the remaining branch of T 148 to the suction inlet of eductor 145. Other connections to tank 138 include a valved drain connection 151 at the bottom and a valved vent connection 152 at the top.

Figure 30:
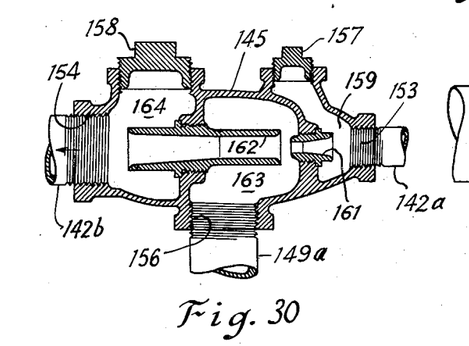
Fig. 30 is an enlargement, in section, of a drain pump unit detail.

The eductor 145 is a known piece of equipment adapted to receive and discharge one body of liquid, or other fluid, through the jet action of a second body of liquid directed therethrough under pressure. As detailed in Fig. 30, the eductor 145 includes a pressure liquid inlet 153 having an inlet connection 142a from valve 143, and an opposite liquid discharge outlet 154 having an outlet connection 142b to tank 138, the suction inlet 156 having an inlet connection 149a from valve 150 through which liquid is admitted from drain line 14. Alternate inlet and outlet openings are closed by plugs 157, 158, respectively, as not being utilized in the present arrangement. Liquid entering the eductor through inlet connection 142a is admitted under pressure to inlet chamber 159 from which it is directed through pressure nozzle 161 to produce a high velocity jet in alignment with a tapered discharge nozzle or throat 162, the pressure nozzle 161 having its outlet within an intermediate eductor chamber 163 axially spaced from the inlet of the discharge throat 162. As a result, liquid is caused to flow into intermediate chamber 163 through the suction inlet connection 149a and to combine with the jet-producing liquid or operating medium for discharge therewith into and through outlet chamber 164 and connection 142b.

When the system is to be placed in normal operation it is assumed that the main fuel valve 18 and all section line valves 19 are closed to prevent discharge of oil from the system, valve 133 in recirculation line 131 being open and valve 134 in drain return line 132 closed. The main pump unit 11 is then started up to cause oil to be recirculated between unit 11 and the main fuel storage 115, the oil thus being available in feed main 12, at its inlet end, at the predetermined normal operating pressure of 1500 p. s. i., for example. The check valve 16 blocks the flow of oil from feed main 12 into drain line 14. The main fuel valve 18 may then be opened leaving only section valves 19 to be opened when burners are to be operated.

When a demand is received for burner operation, the ignitors 52 associated with the burners are placed in circuit with an electric current supply, not shown, whereupon after a period of about two-and-one-half minutes, when the ignitors have reached normal ignition temperature, section valves 19 for the sections to be operated are opened to supply oil to the burners at the normal operating pressure. Opening of a feeder valve 19 automatically causes the corresponding drain valve 23 to be closed to block off connection 21 to drain line 14. Ignition of the spray from successive burner nozzles 32 is effected in the manner already described, whereupon the electric supply to the ignitors may be cut off.

Prior to closing down any burner section, the drain pump unit 15 is operated to place drain line 14 under suction by establishing a circulation of oil between pump 135 and tank 138 through eductor 145, a sufficient amount of oil being continuously retained in the tank to keep the inlet to pump 135 submerged. During this step of the operation, valves 137, 143 and 150 are open, and valve 147 closed, the flow path from the tank to the pump being through line 136, and from the pump to the tank through lines 139 and 142, including eductor 145.

When burners are to be closed down, feeder valves 19 for the sections to be rendered inactive are closed, thus cutting off the supply of oil to the sections, and automatically opening the associated valves 23 and connections 21 to drain line 14. The suction continuously produced in eductor 145 and transmitted through connection 149 to drain line 14 exerts a pull of about 10 p. s. i. which immediately acts to withdraw oil from all inactive burner lines 5, 6, 7, 8 or 9, thereby relieving residual oil pressure in inactive lines and risers and thereafter lowering the oil level therein so that little or no oil is allowed to escape from the sections once the oil supply pressure thereto has been cut off. If desired, the withdrawal of oil may be continued until all inactive burner lines are completely drained and the oil transferred to the temporary storage tank 138.

Where there is a slope to the terrain, as indicated in Fig. 2, some of the burner nozzles are necessarily at a higher elevation than others and, in some instances, the corresponding burner lines may also be at different elevations, also as indicated; for example, in sections A and E, all burners 10 of section A are at elevations higher than all burners 30 of section E, and burner line 5, section A, is also at a higher elevation than burner line 9, section E. Assuming that sections A and E are being shut down, so that further oil supply to these sections is cut off, while residual pressure may cause a certain amount of dribble from most of the burners, the major escape is due to the difference in elevations causing oil to escape from burners at the lower elevations until the level in both sections A and E has been lowered to the level of the lowermost burner, herein indicated as a burner 30 at the extreme left of burner line 9. Thus the withdrawal of oil from inactive sections to at least the level of the lowermost burner therein, obviates the accumulation of relatively large quantities of oil on the ground, and the possibility of ground fires immediately after burner shut-down or at other times.

The oil returned to tank 138 may be withdrawn through connection 151, for example, for transportation back to the main fuel storage 115; or when the main pump unit 11 is shut down, may be pumped back to storage by means of pump unit 15. In the latter case, with the main fuel valve 18 closed, valves 137 and 147 are open, and valves 143 and 150 closed, to cause oil to be withdrawn from tank 138 through connection 136 and to be delivered by pump 135 through connections 139 and 146 into drain line 14 through which it continues past check valve 16 and globe valve 17 into fuel main 12; the flow continuing through connection 129, including its drain return portion 132, now open, and thus to the main fuel oil storage 115.

Figure 31:
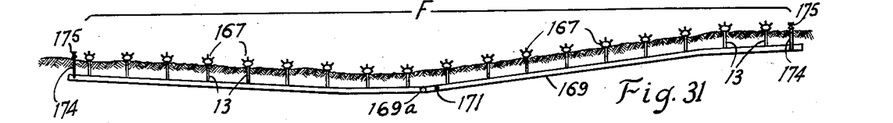
Figs. 31 and 32 are diagrammatic layouts, in elevation and in plan respectively, showing a modification of the system disclosed in Figs. 1 and 2.
Figures 32, 34, 35:
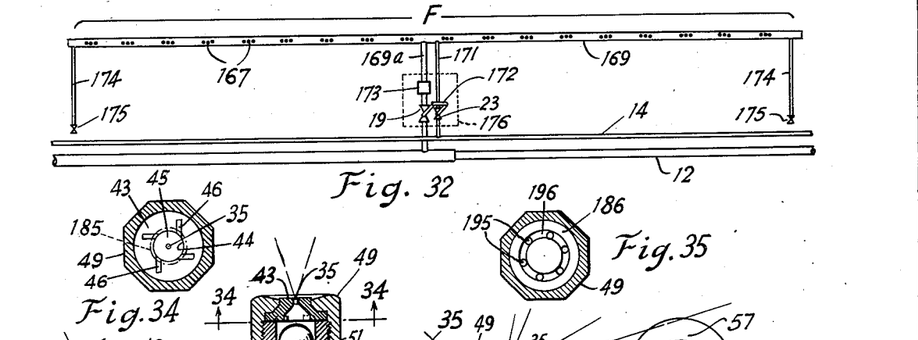
Figs. 34 and 35 are sectional views of Fig. 33 taken along lines 34—34 and 35—35 respectively.

Figs. 31 and 32 are diagrammatic illustrations of a modified form of fog dispersal system especially arranged to prevent the escape of oil from any inactive section or sections without the necessity of withdrawing oil therefrom, the system being particularly adapted for installation of burner nozzles at different elevations, as in the case of a sloping terrain.

Fig. 31 is illustrative of a single burner section F generally similar in its relation to a runway, not shown, as any of sections A, B, C, D, E, indicated in Figs. 1 and 2, burners 167 being arranged at suitable spacings in a single row and connected by risers 13 to a burner line 169 having its feeder portion 169a connected to fuel feed main 12. The burner line 169 is installed suitably at substantially the same depth throughout to enable risers 13 of substantially equal lengths to be utilized so as to afford uniform projection of all burners above ground level, the burner line 169 sloping in opposite directions in accordance with the slope of the terrain, and thereby providing an intermediate lowermost burner line portion to which the feeder connection 169a is preferably joined. The feed main 12 is preferably installed horizontally, at or below the lowermost burner line portion of a single section F, as shown, or where a number of such sections are involved, at or below the level of the lowermost burner line portion of the system, similar to the arrangement previously described.

As in Figs. 1 and 2, feed main 12 may be connected through a main fuel valve 18 to a feed pump unit 11, the section or drain line 14 having one end portion connected to feed main 12 through valves 16 and 17 at a point intermediate valve 18 and unit 11, and its opposite lowermost end portion connected to a suction pump unit such as unit 15. Each section, such as F, includes a connection 171 to suction line 14 from the lowermost portion of its burner line 169. Plug valves 19 and 23, in pressure connection 169a and suction connection 171, respectively, are preferably coupled for operation in unison, as by a link mechanism 172, generally of the type detailed in Figs. 3 and 4, a strainer 173 being provided in feeder connection 169a at the outlet side of valve 19, and the entire control valve assembly being enclosed within a pit 176 as represented by the dotted rectangle. A vent connection 174 including a valve 175 is provided in each burner line at the highest point therein, or at each of the highest points as in the case of burner line 169, the purpose of the vent being to permit withdrawal of oil from the line if desired.

Figure 33:
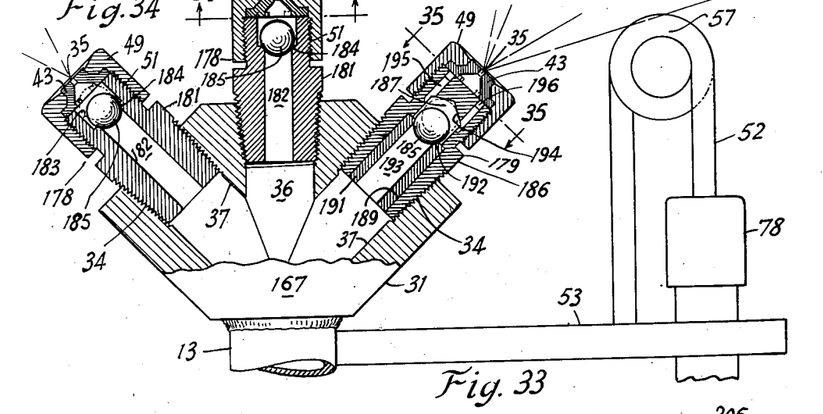
Fig. 33 is a side view, similar to Fig. 13, including modifications of burner nozzles for the system of Figs. 31 and 32.

Each burner 167 suitable for the system of Figs. 31 and 32 preferably embodies a construction whereby the total outlet therefrom is automatically sealed against air intake when the oil supply pressure is cut off and the burner line placed under suction. Fig. 33 illustrates one form of burner 167 wherein three atomizing nozzles are arranged in substantially the same relation to each other and to an ignitor coil 57, as in the case of burner 10 in Fig. 13. Duplicate nozzles 178, 178 are installed in positions remote from the ignitor while the third nozzle 179, providing a different character of spray in starting up, is installed in a position adjacent the ignitor. In other burners 167 not associated with ignitors, either form of nozzle 178 or 179 may be used throughout.

Each nozzle 178 includes a body portion 181 suitably secured in burner body 31 as by threads 34, a central bore 182 in part 31 terminating in an enlarged outer end cylindrical recess or counterbore 183, the rim or bore 182 at its intersection with the base of recess 183 being beveled as at 184 to provide a circular seat for a stainless steel ball 185. A sprayer plate 43 or 43a, as previously described, is assembled against the outer end of nozzle portion 181 where it is held by cap 49.

When nozzle 178 is in operation the pressure of oil supplied thereto forces ball 185 from its seat 184 into contact with the circular rim 44 of whirl chamber 45, a position indicated by the dotted circular outline, thus closing off entrance to the whirl chamber except through the inner ends of sprayer plate slots 46, and thereby causing the oil to enter the whirl chamber in substantially tangentially directed streams as in nozzles 32. In starting up, while ball 185 is being lifted toward its seat against rim 44, the oil enters the whirl chamber longitudinally instead of tangentially and thus for a brief period is discharged from orifice 35 in a relatively solid stream. The form of discharge changes quickly however to the normal angularity of spray cone as discharged at full capacity from nozzle 32. When the oil supply pressure to burner 167 is cut-off and the burner placed under suction, ball 185 is pulled downward, assisted by gravity, against seat 184 to maintain a seal against intake of air.

Nozzle 179 herein shown adjacent ignitor coil 57 includes a nozzle body 186 formed with a central cylindrical closed end fuel passage 187 having its inlet end portion 188 of enlarged diameter to receive and hold a bushing or sleeve 191 therein, the bushing providing a beveled circular seat 192 for ball 185 at the inner end of the central bushing passage 193, the seat 192 being spaced a sufficient distance from the conical end surface 194 of passage 187 to permit the required longitudinal movement of ball 185 therebetween. Circumferentially spaced fuel conducting ports 195 extend from an inner end portion of passage 187 to an annular groove or recess 196 in the outer end surface of nozzle body 186. A sprayer plate 43 and cap 49 complete the nozzle assembly as in Fig. 33.

In this form of nozzle, when ball 185 is lifted from its seat 192 by oil supplied to the nozzle, the oil is released into the inner end of passage 187 from which it is conducted through ports 195 to the annular recess 196 and thence to sprayer plate slots 46, the ball 185 being forced against the conical surface 194 where it remains centered with respect to the concentrically arranged ports 195 while oil is flowing. The ball thus merely acts as a valve and has no effect on the character of spray discharged from orifice 35, the form of spray in starting up and at normal capacity therefore being identical with that discharged from nozzle 32. Nozzle 179 is thus particularly adapted for use adjacent an ignitor 52 where in starting up the initial spray cone of relatively wide angle will contact the ignitor coil 57, whereas at normal capacity the narrower spray cone will clear the coil.

When the section F is to be closed down, it is assumed that the suction pump unit 15, or other equivalent means, is in operation to exert a suction on suction line 14. Valve 19 is then moved to its closed position to cut off oil supply to burner line 169 whereupon valve 23 is automatically opened to place burner line 169 under suction. The suction pressure assumed to be of the order of 10 p. s. i. as in the system previously described, is transmitted to all nozzles 178 and 179 where it immediately acts to pull the balls 185 inward against their respective seats to seal the nozzles, and thereby the entire section against intake of air.

The dribble or escape of oil from the nozzles after shut-down is thus prevented, whether due to residual pressure or more particularly to differences in nozzle elevations, a distinct advantage of the system being that no oil need be withdrawn from the system, thereby economizing in the power required for pumping. A further advantage is that the system is maintained in complete readiness for instant starting, with oil at the nozzles, the moment the oil pressure supply is again opened up. Provision is made however for draining the section, if desired, by installing valved vent connections 174 which when opened allow air to enter the section to permit withdrawal of oil as in the system previously described.

Figures 36, 37:
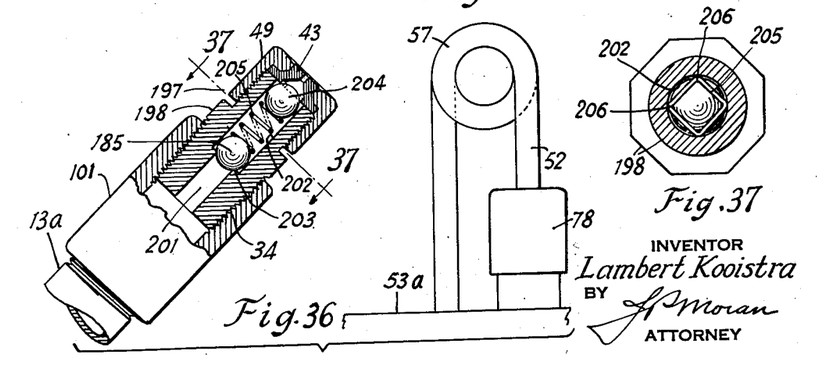
Fig. 36 is a side view, similar to Fig. 18, including a further modification of burner nozzle.
Fig. 37 is a sectional view of Fig. 36 taken along line 37—37.

Figs. 36 and 37 illustrate a burner-ignitor combination, similar to the arrangement in Fig. 18, wherein a modified form of nozzle 197 is indicated, suitable for use in a system such as disclosed in Figs. 31 and 32, the nozzle 197 producing a character of spray substantially equivalent to the spray produced by nozzle 179 and accordingly being interchangeable therewith particularly in an inclined position adjacent an ignitor. Nozzle 197 may however be installed in any position, with or without association with an ignitor, and therefore is interchangeable with any other nozzle hereinbefore described. Nozzle 197 includes a body portion 198 suitably secured in coupling 101 as by threads 34, and having a central circular fuel passage 201 extending therethrough, the outlet end of passage 201 being enlarged as at 202 to form an intermediate shoulder portion providing the beveled circular seat 203 for ball 185, a second ball 204 being positioned adjacent the sprayer plate 43 where it is maintained in contact with rim 44 at the base of whirl chamber 45 by means of spring 205 urging balls 185 and 204 in opposite directions. Spring 205 is desirably of rectangular formation transversely of its length as shown in Fig. 37 so as to provide corner portions 206 substantially in contact with the circular inner wall of passage 202 and thereby maintain axial spring alignment with minimum resistance to axial movement during operation.

It is evident from the foregoing description that the system disclosed affords numerous advantages over prior developments. The general construction is of simple character lending itself to facility and economy of manufacture, installation and operation. Various fuels may be used, and a wide range of thermal capacities attained by changes in the size of sprayer plates, and in fuel pressures, used. The system affords instantaneous smokeless starting using a cold fuel, clean high heat-release combustion while in operation, and a positive cut-off of combustion and fuel when being shut down. The bulk of the apparatus along the runway is installed below ground level where the parts are removed from the zone of intense heat, while those parts above ground level, being of small size, present little or no obstruction to field traffic, and further can be economically made of stainless metals to resist deterioration both because of their proximity to the flame and weather conditions.

While in accordance with the provisions of the statutes I have illustrated and described herein the best forms of my invention now known to me those skilled in the art will understand that changes may be made in the form and in the field of use of the apparatus disclosed without departing from the spirit of the invention covered by my claims, and that certain features of my invention may sometimes be used to advantage without a corresponding use of other features.

I claim:

1. A method of dispersing fog over an area which comprises discharging a series of spaced jets of finely atomized liquid fuel into the atmosphere from points superjacent ground level with adjacent jets spaced sufficiently to avoid flame interference and yet arranged with said jets in interignitable relation, and igniting one of said finely atomized fuel jets to establish a substantially continuous line of flame.

2. A method of dispersing fog over an area which comprises discharging a series of high pressure mechanically atomized jets of relatively low volatile high flash point liquid fuel into the atmosphere with adjacent jets spaced and arranged so as to avoid flame interference, and igniting said atomized fuel jets in said series.

3. A method of dispersing fog over an aircraft landing area which comprises discharging a series of finely atomized jets of liquid fuel into the atmosphere from points adjacent ground level along at least one side of the landing area with said jets in interignitable relation, and igniting one of said atomized fuel jets in said series to establish a substantially continuous line of flame along the side of said landing area.

4. A method of dispersing fog over an aircraft landing area which comprises discharging mechanically atomized jets of relatively low volatile high flash point liquid fuel into the atmosphere from points superjacent ground level at pressures in excess of 500 p. s. i. along one side of the landing area with said fuel jets in interignitable relation, and electrically igniting one of said jets to establish substantially continuous line of flame along the side of said landing area.

5. A method of dispersing fog over an aircraft landing area which comprises discharging mechanically atomized jets of relatively low volatile high flash point liquid fuel into the atmosphere at a discharge velocity and from points at a level above ground level sufficient to create a substantial induction of the surrounding air into contact with the discharged jets, and igniting said jets to establish a high temperature zone of clear flame along one side of said landing area.

6. A method of dispersing fog over an aircraft landing area which comprises supplying a relatively low volatile high flash point liquid fuel at a high pressure, and atomizing said fuel at said high pressure discharging the fuel in a series of atomized jets into the atmosphere adjacent ground level along at least one side of said landing area with the jets arranged in groups and the jets in each group in interignitable relation, igniting one of the jets in each group and maintaining a substantially continuous line of flame along the side of said landing area during the desired aircraft operating period, controlling the high pressure liquid fuel supply at a point in the fuel supply path remote from the point of atomized fuel discharge, cutting off the high pressure liquid fuel supply at said remote point of control and simultaneously preventing the discharge of residual fuel in said supply path beyond the point of fuel cutoff.

7. A fog dispersal system for an aircraft landing area comprising a series of liquid fuel atomizing nozzles spaced along one side of said landing area, each of said nozzles being exposed throughout to the atmosphere surrounding all of said nozzles and adjacent fuel atomizing nozzles being spaced and arranged to discharge atomized fuel jets directly into said atmosphere in interignitable relation, and means for supplying an atomizable liquid fuel under pressure to said fuel atomizing nozzles.

8. A fog dispersal system for a predetermined area comprising a series of liquid fuel atomizing nozzles spaced relative to said area, said nozzles being spaced and arranged to discharge atomized fuel jets directly into the atmosphere common to all of said nozzles in directions avoiding interference between adjacent flames and yet sufficiently close to be in interignitable relation, and means for supplying an atomizable liquid fuel under pressure to said nozzles.

9. A fog dispersal system for an aircraft landing area comprising a pipe line having groups of liquid fuel atomizing nozzles spaced along one side of said landing area, adjacent nozzles of each group being spaced at lesser distances than the distances separating adjacent nozzle groups and being arranged to discharge atomized fuel jets in directions avoiding interference between adjacent flames of each nozzle group and the flames of adjacent nozzle groups while having the fuel jets of at least each nozzle group in interignitable relation, and means for supplying an atomizable liquid fuel under pressure to said pipe line and nozzles.

10. A fog dispersal system for an aircraft landing area comprising a pipe line having groups of liquid fuel atomizing nozzles spaced along one side of said landing area, each of said nozzle groups including at least one nozzle arranged to discard a jet of atomized fuel in a direction generally opposite to the direction of jet discharge by at least one nozzle of the next adjacent group, adjacent nozzles of each group being spaced and arranged to discharge atomized fuel jets in directions avoiding interference between the flames of each nozzle group and the flames of adjacent nozzle groups when the fuel jets are ignited while having the fuel jets of each nozzle group and said oppositely directed fuel jets of adjacent nozzle groups in interignitable relation, and means for supplying an atomizable liquid fuel under pressure to said pipe line and nozzles.

11. In a fuel burning fog dispersal system operative in relation to an airfield landing strip, an underground burner conduit installed longitudinally of said strip, a series of burner risers individually connected to said burner conduit and terminating adjacent ground level in burner heads spaced apart in a row substantially parallel to said strip at one side thereof, said burner heads throughout said row terminating in liquid fuel atomizing nozzles arranged to discharge upwardly in a common substantially vertical plane, each of said nozzles being exposed throughout to the atmosphere surrounding all of said nozzles and thereby discharging directly into said atmosphere in common with nozzles associated with burner heads throughout said row.

12. In a fuel burning fog dispersal system operative in relation to an airfield landing strip, a pair of underground liquid fuel conduits installed horizontally along one side of said strip in parallel relation to each other and to said strip, a series of burner heads connected alternately to the respective fuel conduits of said pair and terminating above ground level in nozzles disposed at substantially equal spacings in a row intermediate the vertically projected locations of said underground conduits, each of said burner heads terminating in a plurality of liquid fuel atomizing nozzles discharging upwardly in divergent relation in a vertical plane, the axis of discharge of one of said nozzles of each burner head being substantially vertical.

13. In a fuel burning fog dispersal system operative in relation to a predetermined area, liquid fuel atomizers disposed in a row relative to said area, an underground supply conduit in which liquid fuel is maintained under pressure and to which said atomizers are connected, an underground drain conduit having its elevation throughout lower than said supply conduit, and means for simultaneously cutting off the fuel supply to said supply conduit and placing said drain conduit under suction.

14. In a fuel burning fog dispersal system operative in relation to an airfield runway, an underground burner conduit installed longitudinally of said runway, a series of upwardly extending burner risers connected to said burner conduit, a series of burner heads spaced apart in a row paralleling said runway and individually connected to the upper ends of said risers, each of said burner heads including a fuel atomizing nozzle disposed adjacent the ground level, a valved connection between said burner conduit and a source of fuel oil under pressure, and means for preventing the escape of oil from said nozzles during the period of residual pressure decrease therein following the closing of said valved connection.

15. In a fuel burning fog dispersal system operative in proximity to an airfield runway, liquid fuel atomizers arranged adjacent ground level in a row laterally of said runway, a series of underground burner conduits to which said atomizers are connected in groups, a feed main having a separate valved feeder connection to each of said burner conduits, a liquid fuel storage container, a pump connected to said fuel storage container for supplying fuel to said main under pressure, a return flow connection from the outlet of said pump unit to said fuel storage container, an underground drain conduit installed at an elevation lower than any of said burner conduits, means including a pump connected to said drain line for withdrawing fuel from any of said burner conduits when the feeder connection thereto is closed, and means including said last named pump for returning the fuel thus withdrawn to said fuel storage container.

16. A method of dispersing fog over a predetermined area which comprises discharging atomized liquid fuel directly into the atmosphere in a series of jets spaced and arranged so as to avoid flame interference when said jets are ignited while maintaining a substantially continuous high thermal output zone marginally of said area, and effecting ignition of said atomized fuel jets in said series.

17. A method of dispersing fog over a predetermined area which comprises discharging atomized liquid fuel directly into the atmosphere in a series of jets at a discharge velocity and from points at a level above the level of said area sufficient to create a substantial induction of the surrounding air into contact with said jets, and effecting ignition of said atomized fuel jets in said series to establish a high temperature flame zone marginally of said area.

18. In a fuel burning fog dispersal system operative in relation to an airfield runway, underground fuel supply conduit means having a portion installed longitudinally of said runway, a series of burner risers individually connected to said conduit means portion, a series of nozzles connected to the upper ends of said risers and arranged to discharge jets of atomized fuel directly into the atmosphere from points adjacent ground level, said risers and the associated nozzles providing a continuation of the fluid supply path provided by said conduit means, a valve in said conduit means between said source and said nozzles, a second underground conduit means connected to said fluid supply path at a point between said valve and the point at which fuel is discharged from said nozzles, and means for subjecting said second conduit means to internal pressure lower than the pressure at which fuel is supplied to said nozzles.

LAMBERT KOOISTRA.

REFERENCES CITED

The following references are of record in the file of this patent:

UNITED STATES PATENTS

| Number | Name | Date |
|---|---|---|
| 966,395 | Gothan | Aug. 2, 1910 |
| 1,571,969 | Ruprecht | Feb. 9, 1926 |
| 1,646,503 | Stewart | Oct. 25, 1927 |
| 1,957,207 | Harrington | May 1, 1934 |
| 2,015,923 | Davis | Oct. 1, 1935 |

OTHER REFERENCES

"Aviation News" of Dec. 3, 1945, page 12.

"The Engineer," issue of June 8, 1945, pages 452 and 453; issue of June 15, 1945, pages 471, 472 and 473; issue of June 22, 1945, pages 486 and 487.

"The Engineering Journal" (of Canada), issue of October 1945, pages 634, 635, 636, 637, 638, 639 and 640.